United States Patent [19]

Chase

[11] Patent Number: 5,038,561
[45] Date of Patent: Aug. 13, 1991

[54] THERMAL INSULATORS FOR ROCKET MOTORS

[75] Inventor: Michael J. Chase, Shropshire, England

[73] Assignee: Royal Ordnance plc, London, England

[21] Appl. No.: 398,961

[22] Filed: Aug. 28, 1989

[30] Foreign Application Priority Data

Sep. 13, 1988 [GB] United Kingdom ............... 8821396

[51] Int. Cl.⁵ ............................................. F02K 9/34
[52] U.S. Cl. ........................................ 60/254; 60/253; 60/255; 102/287; 428/902
[58] Field of Search ................... 60/253, 254, 255; 102/287; 428/902, 36.4, 36.91

[56] References Cited

U.S. PATENT DOCUMENTS

| | | | |
|---|---|---|---|
| 2,995,011 | 8/1961 | Kimmel | 60/255 |
| 3,690,101 | 9/1972 | Lynch | 60/255 |
| 3,947,523 | 3/1976 | Schaffling | 60/255 |
| 3,973,397 | 8/1976 | Chase et al. | 60/253 |
| 4,458,595 | 7/1984 | Gerrish, Jr. et al. | 60/253 |
| 4,594,945 | 6/1986 | Alexandris | 102/287 |
| 4,632,865 | 12/1986 | Tzur | 428/304.4 |
| 4,663,065 | 5/1987 | Herring | 60/253 |
| 4,911,795 | 3/1990 | Olliff, Jr. | 60/253 |

Primary Examiner—Leonard E. Smith
Assistant Examiner—Laleh Jalali
Attorney, Agent, or Firm—Nixon & Vanderhye

[57] ABSTRACT

A thermal insulator for a rocket motor body comprises a member adapted to be fitted as a sleeve on the outer surface of the body the member comprising a composite of cork having on its outer surface a layer of fibre reinforced polymeric material wherein a substantial proportion of the fibre reinforcement comprises fibres of low-conducting material.

6 Claims, 1 Drawing Sheet

THERMAL INSULATORS FOR ROCKET MOTORS

BACKGROUND OF THE INVENTION

1. Field of the Invention

The present invention relates to thermal insulators for rocket motors.

2. Discussion of Prior Art

Rocket motor designs of the type which are of interest today have existed since the late 1940's. During the intervening years, the design, development and engineering of motor hardware components have progressed appreciably contributing to the continually improving efficiency of associated missiles.

Two fundamental chemical parameters have imposed temperature limitations on motors. Firstly, the burning rates of propellants used in solid propellant rocket motors are related to the propellant temperature and in most instances the control of the burning rate, and consequently, control of the missile, becomes difficult above 60°-80° C., the exact temperature depending on the propellant in use. Secondly, conventional organic polymers, on which many of the adhesives and rubbers used in rocket motor hardware are based, typically start to lose strength at about 100° C. and frequently commence to decompose near 200° C. (Advanced polymers are slowly becoming available which, although of lower strength, may be expected to raise these temperatures but only by a limited amount, say to 200° C. and 400° C. respectively). With a few exceptions the above two fundamental parameters have not inhibited the design of rocket motors to date.

However, an era is approaching when aerodynamic heating (aeroheat) is likely to become increasingly severe. This is inevitable as the speeds of aircraft increase resulting in higher aeroheat temperatures due both to the carriage by those aircraft in captive flight of underslung missiles and to the increasing speed required in missile free flight in order both to attack other high speed aircraft and to avoid interception.

It is very unlikely that propellant technology will change significantly, hence it will be necessary to incorporate a thermal barrier to protect the propellant from aeroheat. This could be on the outer or the inner surface of the motor body and certainly in the former and probably in the latter instance will incur mass and volume penalties. It will also be necessary to modify or protect any organic polymer based hardware materials. If modified, a mass penalty due to their lower strength may be incurred and, if protected, a thermal barrier on the outer surface of the body, as for protection of the propellant, will be required.

Desirably, any protection added also complies with the current military requirements for insensitive munitions, i.e. munitions which are not operationally activated without control in the event for example of bump, shock, vibration or in a fuel fire in storage or under bullet or shrapnel attack. Furthermore such protection desirably has suitable mechanical properties in typical environmental conditions e.g. over a wide range of environmental temperatures and humidities and other atmospheric conditions e.g. wind, rain, hail etc.

It is therefore appropriate to provide as a thermal insulator to protect against aeroheat a material which is specially selected to provide an optimum combination of properties, whereby there is no substantially adverse effect on the cost, weight and volume or performance of rocket motor designs incorporating such a material.

SUMMARY OF THE INVENTION

According to the present invention in one aspect there is provided a thermal insulator for a solid propellant rocket motor body comprising a member adapted to be fitted as a sleeve on the outer surface of the body the member comprising a composite of cork having on its outer surface a layer of fiber reinforced polymeric material wherein a substantial proportion of the fiber reinforcement comprises fibers of low-conducting material.

By a 'low conducting' material is meant a material having a thermal conductivity lower than that of carbon. Since carbon can have typically (at 0°C.) a thermal conductivity of 100 to 5000 units where 1 unit is the thermal conductivity of air 'low-conducting' means having a thermal conductivity of less than 100 times that of air at 0°C.

By a 'substantial proportion' is meant at least 50 per cent desirably at least 90 per cent, preferably at least 95 per cent, of the volume occupied by the fibers. For example, substantially all of the fibers may be low-conducting. Where fibers which are not low-conducting are also included, these may be carbon fibers. Thus up to 50%, but desirably not more than 10%, by volume of the fibers present may be carbon fibers.

The polymeric matrix of the fiber reinforced polymeric material may comprise a chemically cured, eg. cold setting or thermosetting, or thermoplastic resin selected from those well known in the art. For example, as thermosetting materials epoxy, polyester and Friedel Crafts resins are suitable. As thermoplastic materials polysulphone, polyethersulphone are suitable examples.

The reinforcing fibers of the fiber reinforced polymeric material may for example be selected from glass, silica, polyaramid, nylon or polyolefin.

Preferably, the fiber reinforced polymeric material incorporated in the thermal insulator according to the present invention is formed from a flexible resin impregnated cloth which may be wrapped around a hollow body, for example, of cork. The composite may be formed by providing a wrapping around the cork and then treating the material both to polymerise and to bond it to the cork in a known manner. For example, where the cloth is an uncured epoxy resin impregnated cloth the resin of the cloth upon curing at room temperature or by heating to a suitable curing temperature, eg typically 50° C. to 180° C., will provide a suitable unitary structure by bonding to the cork.

Although cork and fiber reinforced polymeric materials are known per se as thermal insulators their use in the form of a composite as in the present invention for application to the outside surface of rocket motor bodies to protect against aeroheat is unusual because the degree of heating and the mechanical stresses involved are different from those encountered in prior art applications of these materials. Cork provides an efficient, inexpensive thermal insulator of low weight which is suitably stiff and provides a suitable surface to enable another layer to be bonded to the outer surface thereof.

The fiber reinforced polymeric material provides good mechanical properties and this together with the cork unexpectedly provides a composite having a suitable combination of properties for use in the protection of rocket motor bodies i.e. suitable rocket motor insulation and mechanical strength over a wide range of environmental conditions at low cost and low weight and volume. Such a material also complies with the requirements of current military insensitive munitions progammes. A further insulating material, which may be the same as or different from that on the outer surface, may also be applied on the inner surface of the insulator according to the present invention.

The insulator according to the present invention may comprise a hollow substantially cylindrical shape, although it may have a shape adapted to fit over protrusions on the outside of the rocket motor body.

The insulator according to the present invention may be used with rocket motor bodies of various known materials, eg. metals such as steel or aluminium alloys or composites such as containing glass, carbon and/or polyaramid fiber reinforced polymeric materials or laminate of metallic and non-metallic materials.

According to the present invention in another aspect, there is provided a method of insulating a rocket motor body which method comprises applying to the outer surface of a rocket motor body a thermal insulator according to the first aspect of the invention described hereinbefore.

In the insulator according to the first aspect of the present invention, the composite may typically be from 0.5 to 10 mm thick, especially from 1 to 4 mm thick. The cork layer may for example be from 0.2 to 5 mm thick especially from 1 to 4 mm thick and the fiber reinforced layer formed thereon may be from 0.2 to 2 mm thick. Preferably the thickness of the cork layer is equal to or greater than that of the fiber reinforced layer.

BRIEF DESCRIPTION OF THE DRAWING

An embodiment of the present invention will now be described by way of example with reference to the accompanying drawing, FIG. 1 which is a cross-sectional end view of a rocket motor body including an insulator embodying the present invention.

DETAILED DESCRIPTION OF PREFERRED EMBODIMENTS

Figure 1:
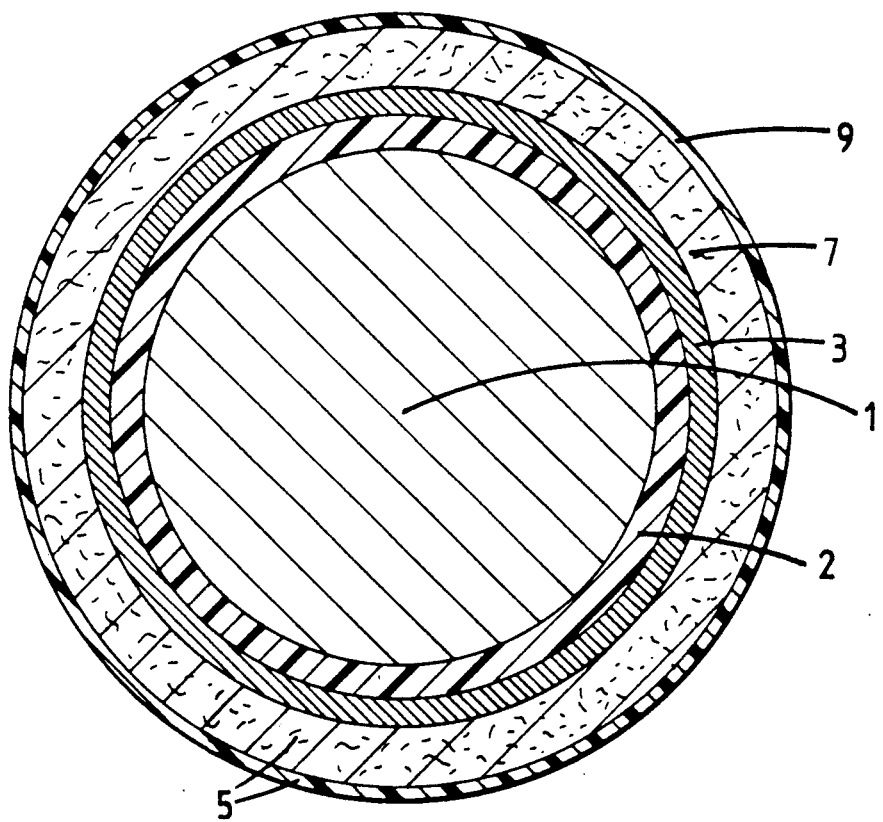

In FIG. 1 the rocket motor shown comprises a solid propellant 1 inside a body 3 having a conventional internal insulator 2 separating the two. The body 3 has an outer thermal insulator 5 formed as a composite sleeve thereon comprising a layer 7 of cork having on its outer surface a suitably cured glass fiber reinforced epoxy resin 9. The insulator 5 is formed from a 3 mm thick sheet of cork rolled to form the layer 7 having bonded thereon an approximately 0.3 mm thick glass fiber reinforced epoxy layer 9 produced using a cloth provided by Marglass having a fiber density per unit surface area of 127 $gm^{-2}$.

A composite such as that described for the insulator 5 has been found to provide suitable protection to the rocket motor body 3 and its contents including the propellant 1 at an external temperature of 170° C., a typical aeroheat temperature. using a composite comprising 1 mm cork having a 1 mm thick glass fiber reinforced epoxy resin thereon it has been found that the time for the body 3 to reach a temperature of 70° C. is approximately five times that experienced with the unisulated (on its outer surface) body 3.

Testing has indicated that the outer thermal insulator 5 is capable of withstanding enviromental conditons of temperature, typically −40 degrees Celsius to +60 degrees Celsius and humidity, typically up to 90% relative humidity, for periods of many weeks without detriment. The insulator 5 also withstands typical environmental weather conditions such as wind, rain and hail. It has also been shown that the thermal insulator 5 does not cause the rocket motor to have inferior insensitive minition properties.

I claim:

1. A thermally insulated rocket motor comprising:
    a rocket motor including a rocket motor body having an outer surface; and
    an insulative sleeve member having an inner surface located in thermal contact with said rocket motor body outer surface, said sleeve member comprising:
        an inner layer of cork having an outer surface; and
        an outer layer of fiber reinforced polymeric material located on said cork outer surface wherein said outer layer comprises a resin impregnated cloth including fibers having a low thermal conductivity.

2. A rocket motor as claimed in claim 1, wherein said polymeric material comprises a chemically cured resin.

3. A rocket motor as claimed in claim 1, wherein said polymeric material comprises a thermoplastic resin.

4. A rocket motor as claimed in claim 1, wherein said low conductivity fibers comprise at least one of glass, silica, polyaramid, nylon and polyolefin.

5. A rocket motor as claimed in claim 1, wherein said resin comprises a means for bonding said fiber reinforced layer to said cork outer surface.

6. A rocket motor as claimed in claim 5, wherein said means for bonding comprises a polymeric material of said fiber reinforced layer being cured in close proximity to said cork layer outer surface.

* * * * *